U. FLANNIGAN & W. H. RUTH.
PLANTER.
APPLICATION FILED AUG. 14, 1908.
926,932.
Patented July 6, 1909.
3 SHEETS—SHEET 3.
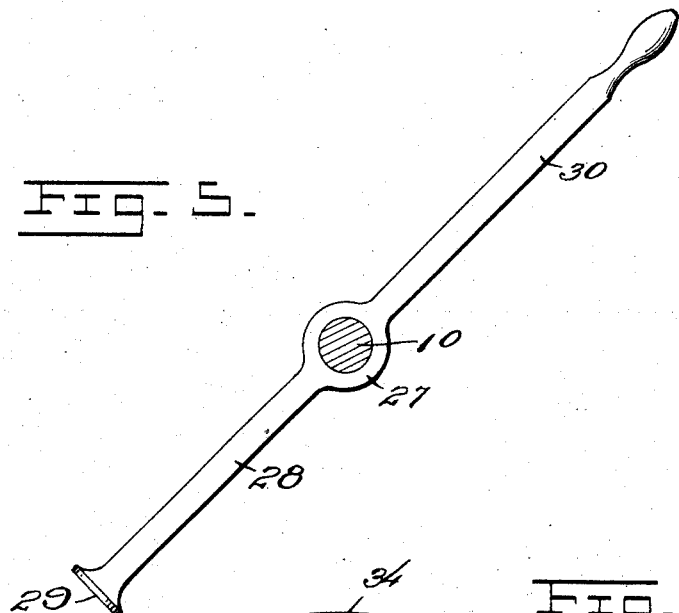
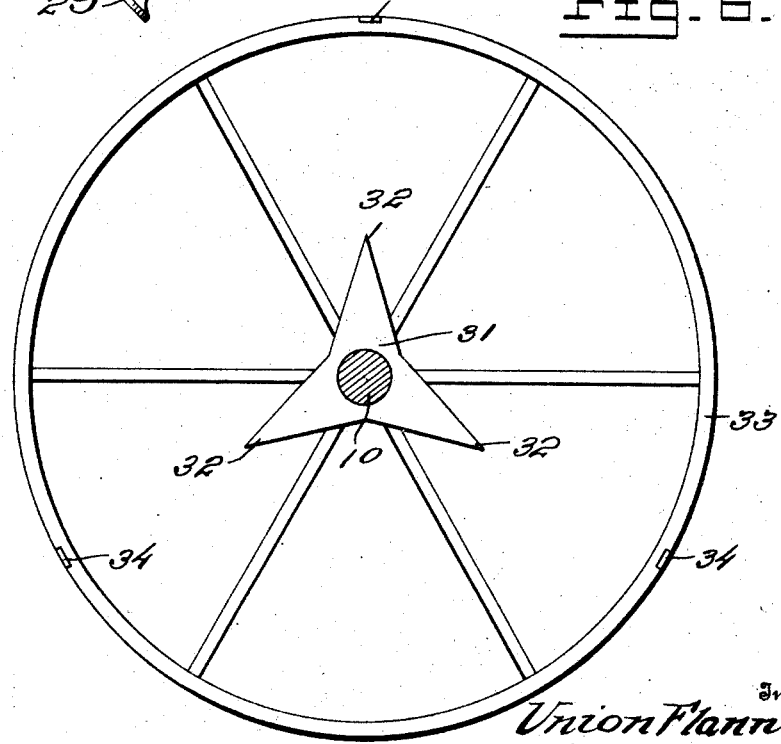

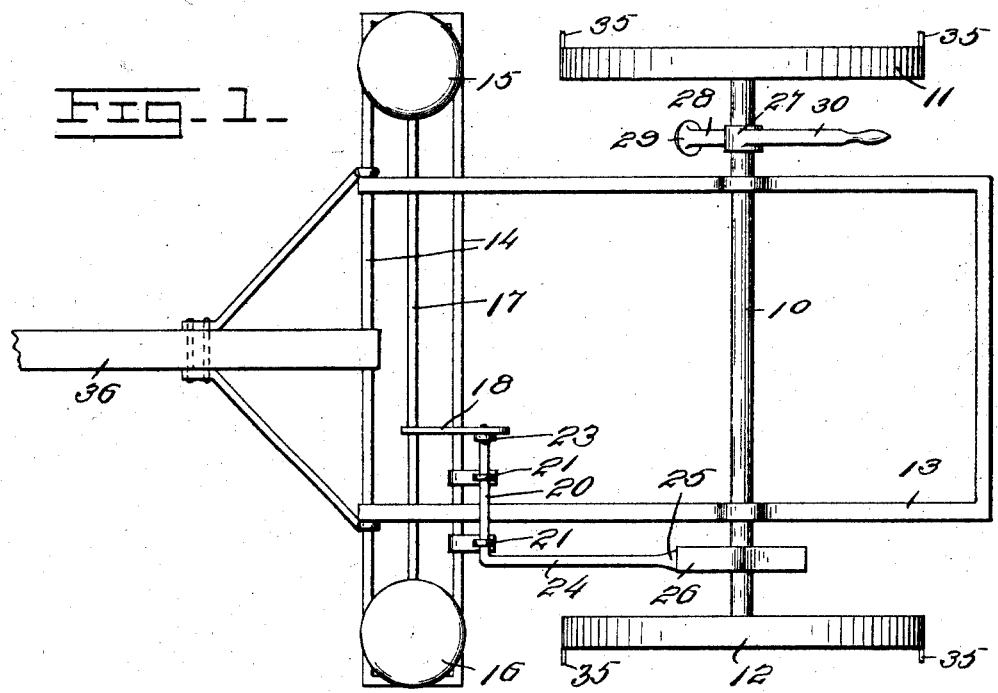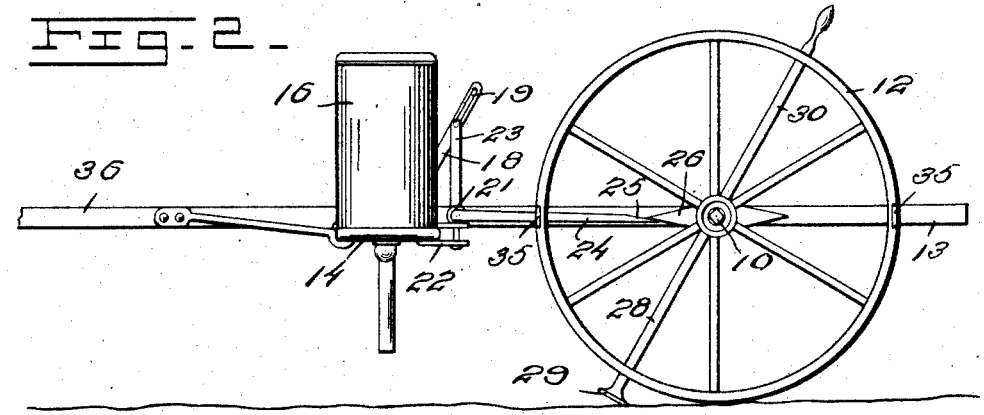

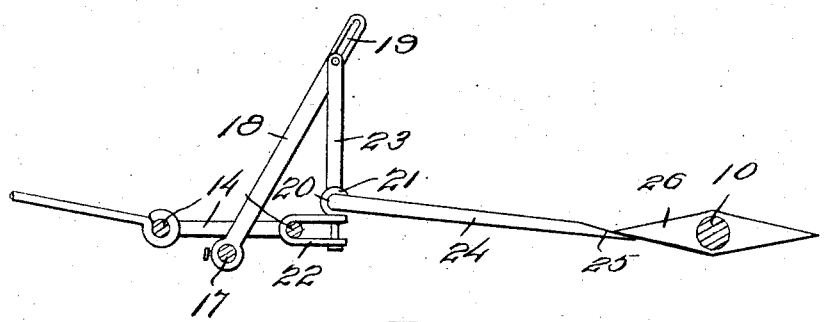
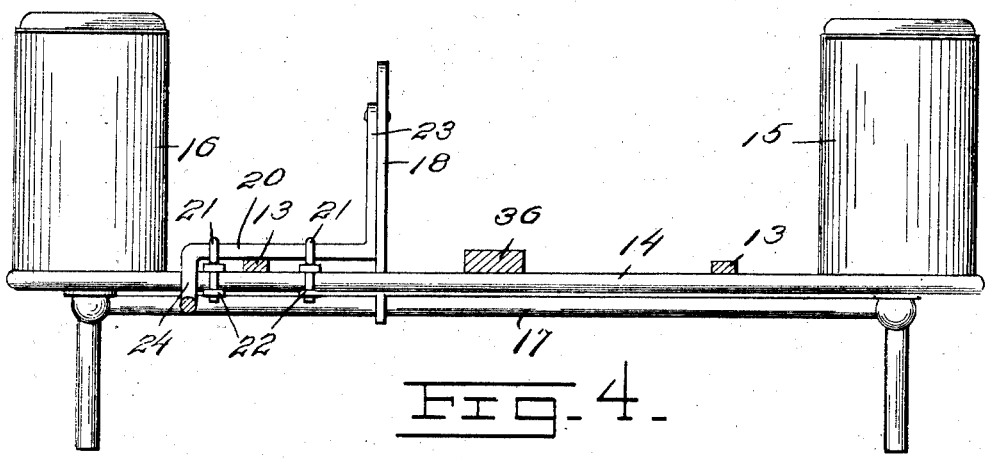

UNITED STATES PATENT OFFICE.

UNION FLANNIGAN AND WILLIAM H. RUTH, OF BROKEN ARROW, OKLAHOMA.

PLANTER.

No. 926,932.      Specification of Letters Patent.      Patented July 6, 1909.

Application filed August 14, 1908. Serial No. 448,597.

*To all whom it may concern:*

Be it known that we, UNION FLANNIGAN and WILLIAM H. RUTH, citizens of the United States, residing at Broken Arrow, in the county of Tulsa and State of Oklahoma, have invented certain new and useful Improvements in Planters, of which the following is a specification.

This invention relates to planters and has special reference to a planter attachment.

An object of this invention is to provide a planter with an attachment whereby the seed will be automatically released from the hoppers intermittently during the traveling of the machine.

Another object of this invention is to provide the wheels of the planter with markers spaced in relation to the releasing means for the seed in the hoppers whereby the seed may be dropped in certain positions as indicated by the markers.

The invention further designs the provision of means whereby the wheel of the planter may be easily and quickly raised for the purpose of turning the wheel to adjust the markers thereon to the desired positions for the proper deposit of the seed.

Other objects and advantages will be apparent from the following description and it will be understood that changes in the specific structure shown and described may be made within the scope of the claims without departing from the spirit of the invention.

In the drawings forming a portion of this specification, and in which like numerals of reference indicate similar parts in the several views, Figure 1 is a top plan view of the device, Fig. 2 is a side elevation of the same, Fig. 3 is a longitudinal section of the trip mechanism, Fig. 4 is a transverse section showing the forward connections, Fig. 5 is a detailed view of the shaft having the wheel lifting mechanism applied thereto, Fig. 6 shows a modification of the trip, axle and wheel of a large planter.

Referring to the drawings, 10 designates the main shaft or axle of the planter which carries the wheels 11 and 12 upon its opposite extremities. A frame 13 of any approved construction is mounted across the shaft 10 having the necessary devices for the proper operation of the planter. The frame 13 carries a cross frame 14 at the forward end which is provided with the hoppers 15 and 16 which are disposed upon the opposite outer ends thereof and which are provided with suitable trip releasing valves operated by the rock shaft 17. The shaft 17 is provided with a rearwardly extending arm 18 in which is formed an elongated slot 19 at its rear extremity. A trip lever 20 is journaled upon the rear edge of the cross frame 14 in eye bolts 21 which are supported in the extremities of U shaped clamps 22 supported on the frame 14. The trip lever 20 is provided with an upwardly and forwardly extending arm 23 at its inner end and a rearwardly extending arm 24 which is flattened into an abutting edge 25 at its rear extremity. The axle 10 carries trip 26 which is provided with two points to engage and depress the arms 24 during rotation of the wheels 11 and 12.

A sleeve 27 is loosely mounted upon the shaft 10 near the wheel 11 which carries a leg 28 on the lower extremity of which is secured a foot 29 to engage the ground and to support the shaft 10 and wheel 11 in a raised position as the leg 28 is longer than the radius of the wheel 11. For the purpose of operating the leg 28 the leg is extended upwardly to form a hand lever 30 while a sleeve 27 is intermediately formed upon the leg 28 and handle 30 to turn the same through the necessary angle.

The wheel 11 is provided with two markers 35 which are so positioned upon the wheel as to indicate the positions of the planter when a quantity of seed is deposited.

The planter is provided with a tongue 36 of usual construction which is secured to the cross frame 14 at the front of the machine.

In the modification shown in Fig. 6 the trip 31 is employed which has three points of contact 32 and the wheel 33 is provided with three markers 34 which are positioned in relation to the contact points 32 to mark off the places where a deposit of seed is to be made.

What is claimed is:

1. In a device of the class described the combination with a planter, of a trip connected with the axle of said planter, a trip lever arranged upon the frame of said planter, a rock shaft mounted on the frame to release seed at times from the planter, an arm extended from said rock shaft for loose engagement with said trip lever, a sleeve rotatably disposed upon the axle of the planter, a leg depended from said sleeve for raising the marker wheel of the planter and a hand lever upwardly extended from said sleeve for revolving the same.

2. In a planter the combination of a frame, an axle on said frame, wheels mounted on said axle, a trip connected with said axle, a trip lever carried by said frame, a rock shaft arranged on said frame for releasing seed therefrom, a radially extended arm secured to said rock shaft and loosely connected to said trip lever, markers secured upon one wheel of said planter, a sleeve rotatably mounted about one end of said axle adjacent the marker wheel, a leg depended from said sleeve for raising the marker wheel at times and a hand lever upwardly extended from said sleeve for actuating the same.

In testimony whereof we affix our signatures, in presence of two witnesses.

UNION FLANNIGAN.
WILLIAM H. RUTH.

Witnesses:
CLARENCE DOUGLASS,
HENRY BALES.